United States Patent [19]
Pudelski et al.

[11] Patent Number: 6,077,909
[45] Date of Patent: *Jun. 20, 2000

[54] LOW CHLORINE CONTENT COMPOSITIONS FOR USE IN LUBRICANTS AND FUELS

[75] Inventors: John K. Pudelski, South Euclid; Christopher J. Kolp, Richmond Hts.; Jeffry G. Dietz, University Hts.; Charles K. Baumanis, Geneva; Stuart L. Bartley, Wickliffe; James D. Burrington, Mayfield Village, all of Ohio

[73] Assignee: The Lubrizol Corporation, Wickliffe, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/799,887

[22] Filed: Feb. 13, 1997

[51] Int. Cl.$^7$ ........................ C08F 267/02; C08F 267/04; C08C 19/14

[52] U.S. Cl. ........................ 525/285; 525/298; 525/301; 525/355; 525/356

[58] Field of Search ..................................... 525/285, 298, 525/301, 355, 356

[56] References Cited

U.S. PATENT DOCUMENTS

| | | | |
|---|---|---|---|
| 3,215,707 | 11/1965 | Rense | 260/326.3 |
| 3,231,587 | 1/1966 | Rense . | |
| 3,454,607 | 7/1969 | LeSuer | 260/408 |
| 3,912,764 | 10/1975 | Palmer, Jr. | 260/346.8 |
| 3,954,812 | 5/1976 | Ruskas et al. . | |
| 4,110,349 | 8/1978 | Cohen . | |
| 4,152,499 | 5/1979 | Boerzel et al. . | |
| 4,234,435 | 11/1980 | Meinhardt et al. | 252/51.5 |
| 4,473,451 | 9/1984 | Benedikt et al. . | |
| 5,041,622 | 8/1991 | LeSuer | 560/190 |
| 5,045,603 | 9/1991 | Davis et al. | 525/356 |
| 5,708,097 | 1/1998 | Baumanis et al. | 525/355 |

FOREIGN PATENT DOCUMENTS

| | | |
|---|---|---|
| 0 172 906 B1 | 8/1989 | European Pat. Off. . |
| 0 355 895 B1 | 12/1994 | European Pat. Off. . |

*Primary Examiner*—Jerry D. Johnson
*Attorney, Agent, or Firm*—Beverly A. Pawlikowski

[57] ABSTRACT

Methods are revealed for producing polyolefin substituted carboxylic acylating agents having less than 1000 ppm chlorine, and reaction products formed therefrom such as dispersants. The carboxylic acylating agents are formed by reacting a polyolefin having labile halogen content with an α-β unsaturated carboxylic acid. The products formed in this invention are used in lubricating compositions.

8 Claims, 2 Drawing Sheets

LOW CHLORINE CONTENT COMPOSITIONS FOR USE IN LUBRICANTS AND FUELS

FIELD OF THE INVENTION

This invention relates to compounds for use in lubricants having low halogen content requirement. Examples of the compounds are reaction products of polyolefins with $\alpha$-$\beta$ unsaturated acids or anhydrides and derivatives such as dispersants formed therefrom. The reaction products and derivatives therefrom have halogen contents compatible with low halogen requirements. The reaction products and derivatives thereof are made from unique polyolefins having labile halogens as starting materials.

BACKGROUND OF THE INVENTION

Polyolefins reaction products and derivatives thereof have long been used in the lubricant, fuels, metal working and other industries. Principle reaction products made from polyolefins are polyolefin substituted succinic anhydrides and dispersants made therefrom for use in lubricants and fuels. The literature abounds with examples of various routes used to make these reaction products which are in large part characterized by the halogen promoted reaction of polyolefins such as polybutenes with $\alpha$-$\beta$ unsaturated acids or anhydrides such as maleic anhydride to form polyolefin substituted succinic anhydrides. The anhydrides are further reacted with metal salts or with amines having one >NH group or alcohols for dispersants.

Problems with the current situation for the synthesis of lubricant additives outlined above is that they have a high halogen content which is causing increased environmental concerns for the continued use of the lubricants and fuels containing them.

A heretofore preferred manner of making lubricant additives has been to alkylate $\alpha$-$\beta$ unsaturated acids or anhydrides in the presence of chlorine. This type of reaction yields halogen containing polyalkenyl or hydrocarbyl-substituted acids or anhydrides which may be called alkyl substituted carboxylic acylating agents. The substituted carboxylic acylating agents containing halogen can then be further reacted with amines, polyamines, alcohols, amino-alcohols or metal salts to form halogen containing dispersants, esters and metal salts. It is not uncommon for the polyalkenyl-substituted carboxylic acylating agents to have chlorine contents of 0.5–1%. This corresponds to 5,000–10,000 parts per million chlorine.

Examples of U.S. patents which describe methods for preparing hydrocarbyl-substituted aliphatic carboxylic acylating agents, and particularly polyalkenyl-substituted carboxylic acylating agents utilizing various amounts of chlorine include U.S. Pat. No. 3,215,707 (Rense); U.S. Pat. No. 3,231,587 (Rense); U.S. Pat. No. 3,454,607 (LeSuer); U.S. Pat. Nos. 3,912,764; 4,110,349; 4,234,435 (Meinhardt); and U.S. Pat. No. 5,041,622 (LeSuer). These patents are incorporated herein by reference in their entirety for disclosure related to the instant invention. U.S. Pat. No. 4,234,435 describes carboxylic derivative compositions produced by reacting at least one substituted succinic acylating agent with a reactant such as amines, alcohols, reactive metals or combinations thereof. The substituted succinic acylating agent consists of polyalkenyl substituent groups and succinic groups. The substituent groups are derived from a polyalkene having an $\overline{Mn}$ value of about 1300 to about 5000 and an $\overline{Mw}|\overline{Mn}$ value of about 1.5 to about 4. The acylating agents are characterized by the presence within their structure of an average of more than one succinic group for each equivalent weight of substituent groups. Because of the presence of the excess of succinic groups in the acylating agents, such compounds have been referred to in the art as "over succinated," and the products described in the '435 patent have also been characterized as detergents and viscosity improving additives in lubricating oil compositions. When such derivatives are incorporated into lubricating compositions, they impart sufficient fluidity modifying properties to the lubricant which are sufficient to permit elimination of all or a significant amount of viscosity index improver from multi-grade lubricant compositions containing the same.

The acylating agents utilized in preparing the lubricant additives described in U.S. Pat. No. 4,234,435 are prepared by reaction of polyisobutene polymer with an $\alpha$-$\beta$ unsaturated dicarboxylic acid or anhydride such as maleic anhydride in the presence of chlorine. In such instances, the products which are obtained from the reaction and the products obtained from subsequent reaction with amines, alcohols, alcohols and metal compounds contain various amounts of halogen. Due to environmental concerns, it has now become desirable to eliminate or reduce the level of chlorine. One potential solution to eliminating the chlorine contained in such lubricant and fuel additives is simply to not use chlorine in the manufacturing process. Another potential solution is to develop procedures for treating such compositions to remove the chlorine which is present. One procedure for treating various chlorine-containing organic compounds to reduce the level of chlorine therein has been described in a European patent application published under Publication No. 655,242. The procedure described therein for reducing the chlorine content of organochlorine compounds comprises introducing a source of iodine or bromine into the organochlorine compound and contacting the components of the resulting mixture for a sufficient amount of time to reduce the chlorine content without substantially incorporating iodine or bromine into the organochlorine compound. This procedure is successful in reducing the chlorine content of organochlorine compounds, but in some instances, it is desirable to even further reduce the amount of chlorine in additive compositions which are to be utilized in lubricants and fuels.

Another published method of reducing the chlorine content of organochlorine compounds is described in U.S. Pat. No. 5,489,390. The method comprises treating the chlorine-containing compound with an acid.

As mentioned above, one technique for reducing the amount of chlorine in additive compositions based on polyalkenyl-substituteddicarboxylic acids is to prepare such hydrocarbon-substituted dicarboxylic acids in the absence of chlorine, and procedures have been described for preparing such compounds by the "thermal" process in which the polyolefin and the unsaturated dicarboxylic acid are heated together, optionally in the presence of a catalyst. However, when this procedure is used, it is more difficult to incorporate an excess of the succinic groups into the polyalkenyl-substitutedsuccinic acylating agent, and dispersants prepared from such acylating agents do not exhibit sufficient viscosity index improving characteristics.

It has been proposed in the art that ashless dispersants can be prepared with succinic to polyolefin substituent ratios in excess of 1.3:1 by the thermal process when the polyolefin contains a large amount, such as at least about 70%, of the terminal groupings having an alpha-olefinic bond and/or structures capable of isomerizing to such alpha-olefinic structures. Such structures are vinylidene end groups or groups in resonance therewith and are depicted by structures I and II of Table 1. Such procedures are described in published European Patent Application 355 895 and a polymer with high vinylidene content has been available for many years through BASF. Reactive polyisobutenes having at least 70% of their unsaturation in a terminal position are described in U.S. Pat. Nos. 4,605,808 and 4,152,499. The process described in this patent uses a complex of boron trifluoride and alcohol as catalyst, and a contact time of at least 8 minutes.

Many chlorine-containing methods of forming hydrocarbyl-substituted acylating agents have been described. Patents describing variations on the theme of reacting chlorine with an olefin and maleic anhydride are described in the patents listed above.

One method of preparing succinic acylating agents is conveniently designated as the "two-step procedure" and is described in, for example, U.S. Pat. No. 3,219,666 (Norman et al) which is incorporated herein by reference in its entirety. It involves first chlorinating the polyalkene until there is an average of at least about one chloro group for each molecular weight of polyalkene. (For purposes of this discussion, the molecular weight of the alkene is the weight corresponding to the Mn value.) Chlorination involves merely contacting the polyalkene with chlorine gas until the desired amount of chlorine is incorporated into the chlorinated polyalkene. Chlorination is generally carried out at temperatures of about 75° C. to about 125° C. If a diluent is used in the chlorination procedure, it should be one which is not itself readily subject to further chlorination. Poly- and perchlorinated and/or fluorinated alkyl benzenes are examples of suitable diluents.

The second step in the two-step chlorination procedure is to react the chlorinated polyalkene with the maleic reactant at a temperature usually within the range of about 100° C. to about 200° C. The mole ratio of chlorinated polyalkene to maleic reactant is usually about 1:1. (For purposes of making the two-step chlorinated produce, a mole of chlorinated polyalkene is that weight of chlorinated polyalkene corresponding to the Mn value of the unchlorinated polyalkene.) However, a stoichiometric excess of maleic reactant can be used, for example, a mole ratio of 1:2, 1:3 or even greater.

If an average of more than about one chloro group per molecule of polyalkene is introduced during the chlorination step, then more than one mole of maleic reactant can react per molecule of chlorinated polyalkene. Because of such situations, it is better to describe the ratio of chlorinated polyalkene to maleic reactant in terms of equivalents. (An equivalent weight of chlorinated polyalkene, for the preparation of a two-step chlorinated product, is the weight corresponding to the Mn value plus 34.4 grams for the weight of the chlorine divided by the average number of chloro groups per molecule of chlorinated polyalkene while the equivalent weight of the maleic reactant is its molecular weight.)

Thus, the ratio of chlorinated polyalkene to maleic reactant for each mole of chlorinated polyalkene up to about one equivalent of maleic reactant for each equivalent of chlorinated polyalkene with the understanding that it is normally desirable to provide an excess of maleic reactant; or example, an excess of about 5% to about 25% by weight. Unreacted excess maleic reactant may be stripped from the reaction product, usually under vacuum, or reacted during a further stage of the process as explained below.

The resulting polyalkenyl-substituted succinic acylating agent is, optionally, again chlorinated if the desired number of succinic groups are not present in the product. If there is present, at the time of this subsequent chlorination, any excess maleic reactant from the second step, the excess will react as additional chlorine is introduced during the subsequent chlorination. Otherwise, additional maleic reactant is introduced during and/or subsequent to the additional chlorination step. This technique can be repeated until the total number of succinic groups per equivalent weight of substituent groups reaches about two.

Another procedure for preparing substituted succinic acid acylating agents utilized a process described in U.S. Pat. No. 3,912,764 (Palmer et al) which is expressly incorporate hereby by reference in its entirety.

The polyalkene and the maleic reactant are first reacted by heating them together in a "direct alkylation" procedure. When the direct alkylation step is completed, chlorine is introduced into the reaction mixture to promote reaction of the remaining maleic reactants. According to the patent, 0.3 to 2 or more moles of maleic anhydride are used in the reaction for each mole of olefin polymer; i.e., polyalkene. The direct alkylation step is conducted at temperatures of 180° C. to 250° C. during the chlorine-introducing stage, a temperature of 160° C. to 225° C. is employed. In utilizing this process to prepare the substituted succinic acylating agents useful herein, it would be necessary to use sufficient maleic reactant and chlorine to incorporate at least 1.3 succinic groups into the final product for each equivalent weight of groups derived from the polyalkene.

A further method of preparing a succinic acylating agent is disclosed in U.S. Pat. No. 3,231,587 (Rense) which is herein incorporated specifically by reference. This process, known as the "one step" process, and comprises preparing a mixture of an olefin polymer and maleic anhydride, and contacting said mixture at a temperature above about 140° C. with at least about one mole of chlorine for each mole of maleic anhydride. The product of the above process, as indicated before, is a polyalkenyl-substituted succinic anhydride. The mechanism by which the product is formed is not known. It is known, however, that the process is different from one in which the olefin polymer is first chlorinated and the chlorinated polymer is then allowed to react with maleic anhydride under similar reaction conditions. The two-step process requires a considerably lengthier reaction time and results in products which are much darker in color. Also, if the olefin polymer is to be chlorinated first, the chlorination temperature should not be allowed to exceed 120° C. Higher temperatures are known to cause dechlorination and thus result in products having little or no chlorine.

To carry out the process, it is preferred that the chlorine be introduced into the reaction zone after the olefin polymer has been thoroughly mixed with maleic anhydride. If the chlorine is allowed to come in contact with the olefin polymer prior to the introduction of maleic anhydride, chlorination of the polymer will take place and the advantageous results will not be obtained. The rate of introduction of the chlorine is not critical. Ordinarily, for maximum utilization of the chlorine used, the rate should be about the same as the rate of consumption of chlorine in this reaction.

The minimum temperature at which the reaction of the above process takes place at a reasonable rate is about 100° C.; hence, the minimum temperature at which the process should be carried out is in the neighborhood of about 90° C.–140° C. The preferred temperatures usually range between about 160° C. and about 220° C. Higher temperatures such as 250° C. or even higher may be used but usually with little advantage. The upper limit of the usable temperature is determined primarily by the decomposition point of the components in the reaction mixture.

The stoichiometry of the reaction involved in this process requires approximately equimolar amounts of the maleic anhydride and the chlorine used. For practical considerations, however, a slight excess, usually in the neighborhood of 20–30%, of chlorine is preferred in order to offset any accidental loss of this gaseous reactant from the reaction mixture. Still greater amounts of chlorine may be used but they do not appear to produce any noticeable benefits.

The relative amounts of the olefin polymer and maleic anhydride will vary according to the proportion of the succinic anhydride radicals desired in the product. Thus, for each mole of the polymer employed, one or more moles of maleic anhydride may be used depending upon whether one or more succinic anhydride radicals are to be incorporated in each polymer molecule. In general, the higher the molecular weight of the polymer, the greater the proportion of maleic anhydride which may be used. On the other hand, when a molar excess of the polymer reactant is used, the excess polymer will simply remain in the product as a diluent without any adverse effect.

Other procedures for preparing the polyalkenyl-substituted succinic acylating agents also are described in the art and may be used to prepare the carboxylic acylating compositions. For example, U.S. Pat. No. 4,110,439 (Cohen) describes another version of the two-step process, and U.S. Pat. No. 5,041,622 (LeSuer) describes a three-step process. Both of these patents are herein incorporated by references.

SUMMARY OF THE INVENTION

This invention relates to compositions low in halogen which are useful in lubricants, fuels, and metal working and the invention relates primarily to a unique method of reacting conventional polyolefins with halogens. The halogen used in the reaction is limited to only an amount up to that necessary to halogenate specific olefinic end groups in the polyolefin. More specifically this invention relates to methods of halogenating terminal tetrasubstituted, and tri-substituted groups of polyolefins. The halogen incorporated by reacting with these groups is labile in that much of it is removed during subsequent reactions of the polyolefins. The labile halogen is thought to be in the form of allylic halides which, when reacted with α-β unsaturated compounds, form polyolefin substituted carboxylic acylating agents having a low halogen content of less than about 1000 ppm down to less than 200 ppm or even 100 ppm. The substituted carboxylic acylating agents are oil free. Further reactions of the polyolefin substituted acylating agent with (a) amines and polyamines having at least one >N-H group, (b) organic hydroxy compounds including mono and polyhydric alcohols or aromatic compounds including phenols and napthols and hydroxy-amino compounds, and (c) reactive metals or reactive metal compounds, yield dispersants, esters and metal salts herein all described as dispersant reaction products having halogen contents of less than about 1000 ppm. For dispersants formed from polyamines and the acylating agent, the halogen content is less than about 1000 ppm and preferably less than about 200 ppm. A full discussion of reactions of polyalkenyl substituted carboxylic acylating agents is given in U.S. Pat. No. 4,234,435 which is incorporated herein by reference in its entirety. The chlorine values for reaction products of (a)–(c) with the substituted carboxylic acylating agents are based on the reaction product having an oil content of about 50%. The oil content may be in the range of 40–60% or even a wider range may be used. Thus on an oil free basis the reaction products of (a)–(c) with the acylating agents are roughly the same as for the acylating agent itself. That is, for the reaction products of (a)–(c) with the polyolefin substituted reaction products the halogen content of the dispersant products the halogen content of the dispersant products is nominally 1000 ppm down to 500 ppm or even 100 ppm or less. The chlorine or halogen content of the polyolefin substituted carboxylic acylating agents and the dispersants formed therefrom are on an oil free basis.

DETAILED DESCRIPTION OF THE INVENTION

The polyolefin used in this invention are derived from polymerized $C_2$–$C_6$ mono olefins and are called conventional polyolefins as opposed to high vinylidene polyolefins. The polymers may be homopolymers or terpolymers. The preferred polyolefin is polyisobutene (PIB) formed by polymerizing the $C_4$-raffinate of a cat cracker or ethylene plant butane/butene stream using aluminum chloride or other acid catalyst systems.

The $\overline{Mn}$ range of the polyolefins is from about 300–10,000 or even up to 50,000. However, for instance, the preferred range for polybutenes is $\overline{Mn}$ of about 300–5,000 and the most preferred upper limit $\overline{Mn}$ is in the range of about $\overline{Mn}$ 300–2,500.

TABLE 1

| PIB Terminal Groups | Percent in Conventional PIB | Percent in High Vinylidene PIB |
|---|---|---|
| $\begin{array}{c}\phantom{x}\\ -\underset{\underset{CH_3}{\|}}{\overset{\overset{CH_3}{\|}}{C}}-CH_2-\underset{}{\overset{CH_3}{\|}}C=CH_2\\ \text{I}\end{array}$ | 4–5% | 50–90% |
| $\begin{array}{c}-\underset{\underset{CH_3}{\|}}{\overset{\overset{CH_3}{\|}}{C}}-CH=C\underset{CH_3}{\overset{CH_3}{\diagup}}\\ \text{II}\end{array}$ | 0–2% | 6–35% |
| $\begin{array}{c}-CH_2-\underset{}{\overset{\overset{CH_3}{\|}}{C}}=CH-CH_3\\ \text{III}\end{array}$ | 63–67% tri-substituted | absent or minor |
| $\begin{array}{c}-\underset{}{\overset{\overset{CH_3}{\|}}{CH}}-\underset{}{\overset{\overset{CH_3}{\|}}{C}}=C\underset{CH_3}{\overset{CH_3}{\diagup}}\\ \text{IV}\end{array}$ | 22–28% tetrasubstituted IV and IVA | 1–15% |
| $\begin{array}{c}-\underset{}{\overset{\overset{CH_3}{\|}}{C}}=\underset{}{\overset{\overset{CH_3}{\|}}{C}}-CH\underset{CH_3}{\overset{CH_3}{\diagup}}\\ \text{IVA}\end{array}$ | | |
| $\begin{array}{c}-CH_2-\underset{}{\overset{\overset{CH_2}{\|\|}}{C}}-CH_2-CH_3\\ \text{V}\end{array}$ | 5–8% | 0–4% |
| OTHER | 0–10% | |

The polyolefin made in this manner is termed a conventional polybutene or polyisobutene and is characterized by having unsaturated end groups shown in Table 1 with estimates of their mole percents based on moles of polybutenes. The structures are as shown in EPO 355 895.

The isomers shown in Table 1 for conventional polyisobutene and their amounts were determined from $^{13}$C NMR spectra made using a Burker AMX500 or 300 instrument and UXNMRP software to work up the spectra which were determined in CDCl$_3$ at 75.4 or 125.7 MHz. Table 2 gives band assignments for isomers I, III and IV in Table 1. Disappearance of bands III and IV is correlated with halogenation carried out in this invention. The solvent used was CDCl$_3$ and the band assignments are shifts from TMS for spectra recorded in a 300 MHz instrument.

TABLE 2

| Isomer From Table 1 | $^{13}$C NMR BANDS |
|---|---|
| I | 143.5, 114.7 ppm |
| III | 133.7, 122.9 ppm |
|  | 134.4, 122.6 ppm |
| IV | 121.5, 133.5 ppm |

In this invention, conventional polybutenes having a total of roughly about 80–90 mole percent tri and tetrasubstituted unsaturated end groups (III and IV in Table 1) are reacted with halogen to form halogenated polybutenes. The amount of halogen used is limited to up to that which is necessary to halogenate the tri and tetrasubstituted end groups. An excess over that amount of halogen will result in overhalogenation of the polybutene and reaction products obtained therefrom will not be useful in compositions requiring low halogen content. Halogenation of the tri and tetrasubstituted end groups results in partially halogenated polybutene. The halogen in the partially halogenated products is labile and is lost in further reaction of the halogenated product with the α-β unsaturated compounds as will be demonstrated below. Specific halogenation of the tri and tetrasubstituted end group is controlled by reaction conditions, the amount of halogen used, solvent and temperature.

The proposed polybutene partial chlorination reaction sequence is shown in FIG. 1. The allylic compound formed from III and IV and/or isomers derived therefrom is further reacted with maleic anhydride to form an alkyl-substituted succinic anhydride as shown. PO represents the remainder of the polyolefin.

Under selected reaction conditions, the trisubstituted end group III is halogenated but this has been found to occur at a lower rate constant than tetra halogenation. The vinylidene isomer I is by and large not subject to halogenation under selected reaction conditions. Further, the polyolefin backbone is not chlorinated or is only little chlorinated under reaction conditions selected to halogenate the tetra and trisubstituted end groups. By forming labile allylic halogens in the polyolefin rather than backbone halogens low halogen content products may be made from the partially and selectively halogenated polyolefins. Lack of halogen in the polyolefin backbone is of great importance for the production of low chlorine reaction products since this halogen is difficult to remove and remains with the products. While intractable halogen is identified as being on the polymer backbone, other types of chlorine may be involved.

BRIEF DESCRIPTION OF THE DRAWINGS

Idealized chemistry of partial chlorination is depicted in FIG. 1.

Figure 1:
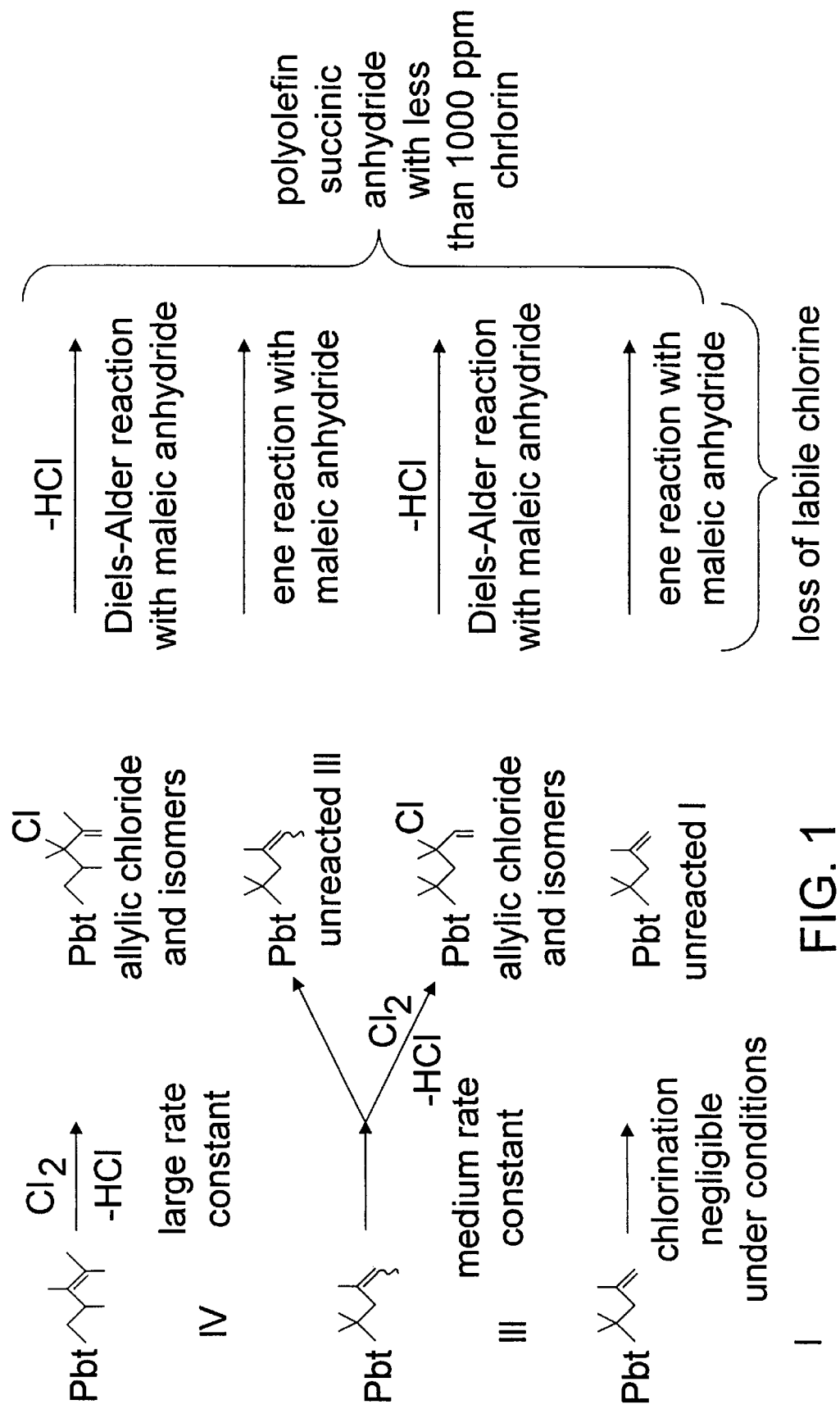

Idealized chemistry of partial chlorination is depicted in FIG. 1. In the partial chlorination step most of the tetrasubstituted isomer IV can be converted to allylic chlorides. The trisubstituted isomer III is converted at a slower rate and the vinylidene I isomers olefins remain mainly unreacted. In a classical direct alkylation process, the tetrasubstituted olefin end groups react sluggishly, if at all, due to steric inhibition in the ene reaction while the less hindered vinylidene and trisubstituted olefin end groups react at better rates. However, partially chlorinated polybutene is highly reactive in the direct alkylation process because the allylic chlorides undergo dehydrochlorination to dienes followed by Diels-Alder reaction with maleic anhydride to give Diels-Alder type polybutene succinic anhydrides. As the direct alkylation proceeds, the unreacted trisubstituted and vinylidene olefins isomers I and III are converted to polybutene-substituted succinic anhydrides via ene reactions. Early generation of the Diels-Alder type polybutene-substituted succinic anhydrides, which help solubilize maleic anhydride in the reaction media, might facilitate the later ene reactions. Operation of the two complimentary succination processes affords good conversion to the polyolefin substituted acylating agent. The carboxylic acylating agents or succinic compounds so formed are lower in halogen than any previously isolated in halogen promoted reaction of polyolefins and α-β unsaturated acids. It is a feature of this invention that polyolefin-substituted succinic anhydrides have a halogen content of less than 1000 parts per million halogen and even less than about 200 parts per million halogen.

In addition to the chlorine to polyolefin end groups ratio, the temperature at which the chlorination reaction is conducted is also of great importance. The preferred temperature range for conducting the chlorination of conventional polyolefins is between 50–190° C. It is even more preferred to conduct the reaction at a temperature from 40° C. to 80° C. if substantially chlorine inert solvents such as hexanes are used.

Another important aspect of the polyolefin chlorination reaction is that it can be conducted in the presence of a solvent. Further in this invention, the reaction for the formation of the alkyl-substituted succinic anhydrides may be run as a one-step reaction for the formation of the alkyl-substituted succinic anhydrides with the polyolefin, halogen and α-β unsaturated acid being reacted at the same time. A further aspect of this invention is that the halogen may be diluted with an inert gas. Also, by following this invention less residual polyolefin results than in direct alkylation synthesis of substituted carboxylic acylating agents.

Experimental Polyolefin Halogenation and Reaction With α-β Unsaturated Anhydrides Conventional polybutenes are commercially available from Lubrizol, British Petroleum, Amoco and Exxon under various trade names. The products are available in a range of molecular weights. Alternatively, a conventional PIB may be synthesized from isobutylene and AlCl$_3$. In this synthesis, 2.6 moles isobutylene was added to 0.0295 moles of aluminum chloride being stirred in hexane under nitrogen in a −40° C. bath. Isobutylene was cooled to −78° C. with dry ice/isopropanol and added dropwise to the AlCl$_3$. Following addition which is exothermic, the reaction mixture was poured into a beaker containing a 7% sodium hydroxide solution. The organic layer was separated, washed with aqueous sodium chloride solution and stripped on an evaporator at 100° C. under reduced pressure.

It has been found that if the polyolefin halogenation reaction is correlated with the tri and tetrasubstituted unsaturated end groups, and the maximum amount of halogen is limited in use only up to that amount of halogen which is necessary to halogenate the tetrasubstituted and trisubstituted unsaturated end groups, then a polyolefin such as polyisobutene having low and labile halogen content results. Since the halogen content of the polyolefin is low and mainly labile and then compounds made from this will necessarily be of low halogen content considering that halogen is replaced by said α-β unsaturated compound in subsequent reactions.

In Table 3, data is presented for the partial chlorination of conventional polyisobutenes, and the subsequent reaction products of the halogenated polyisobutenes with maleic anhydride.

Table 3

A. Reaction of a $\overline{Mn}$ 1000 conventional polyisobutene (PIB) with chlorine at 65–70° C. in 20% weight/weight hexane to form a chlorinated PIB (PIB-Cl), followed by reaction of the chlorinated PIB with 2.5 moles of maleic anhydride per mole of chlorinated PIB for 24 hours at 200° C. to produce a PIB-succinic anhydride. The values in Table 3 are on an oil free basis.

| Moles Cl$_2$ per Mole of PIB | ppm Cl in PIB-Cl | ppm Cl in PIB-succinic anhydride |
|---|---|---|
| 0.2 | 6,740 | 141 |
| 0.3 | 10,500 | 190 |
| 0.4 | 12,680 | 195 |
| 0.5 | 15,900 | 276 |

B. Same as A except PIB $\overline{Mn}$ is 2000, concentration of PIB is 45% weight/weight hexane and 3.0 moles of maleic anhydride were used and a bromine sample included.

| Moles Cl$_2$ per Mole of PIB | ppm Cl in PIB-Cl | ppm Cl in PIB-succinic anhydride |
|---|---|---|
| 0.32 | 4,450 | 84 |
| 0.4 | 6,290 | 121 |
| 0.5 | 7,790 | 183 |
| 0.64 | 10,090 | 234 |
| 0.93 | 13,840 | 413 |
| 1.2 | — | 1,022 |
| 0.4 (bromine) | 22,900 (bromine) | 85 (bromine) |

C. Reaction of $\overline{Mn}$ 2000 PIB with chlorine without the use of solvent

| Moles Cl$_2$ per Mole of PIB | ppm Cl in PIB-succinic anhydride |
|---|---|
| 1. 0.3 | 234 |
| 2. 0.43 | 426 |
| 3. 0.55 | 700 |
| 4. 0.75 | 998 |
| 5. 1.2 | 5,350 |

Reaction conditions:

C.1. Partial chlorination at 150° C. followed by reaction with maleic anhydride at 200° C. for 24 hours, 3 moles maleic anhydride per mole of starting PIB.

C.2. Single reaction with PIB, chlorine, maleic anhydride present during chlorination at 130° C., temperature raised to 205° C. for 8 hours, 2.2 moles maleic anhydride/mole of starting PIB.

C.3. Single reaction with PIB, chlorine, maleic anhydride present during chlorination over 8 hours at 138–190° C., temperature raised to 220° C. for 6 hours, 1.12 moles of maleic anhydride per mole of starting PIB.

C.4. Single reaction with PIB, chlorine, maleic anhydride being present during chlorination over 8 hours at 130–190° C., temperature raised to 204° C. for 8 hours and 216° C. for 6 hours. The mole ratio of maleic anhydride to PIB was 1.12:1.

C.5. Conventional one step process reaction.

Table 3 illustrates that influenced by solvent and temperature, there is a shift from low chlorine containing polyalkenyl succinic acylating agents having chlorine in ppm from about 500 up to about 1000 to high chlorine level acylating agents having chlorine contents of around 5000 ppm. These results illustrate that at some stage in the chlorination reaction there is a shift in which non-labile halogen is incorporated into the polyisobutene. These results are graphically illustrated in FIG. 2 which represent the data of Table B, the chlorination of a PIB $\overline{Mn}$ 2000in hexane.

A preferred method of carrying out this invention is to mix together with heating 6000 grams $\overline{Mn}$ 2000 polyisobutylene (3 moles), maleic anhydride 329 grams (3.36 moles) and chlorine 117 grams (1.65 moles) in the following manner to make a PIB-succinic anhydride. The polymer and anhydride were mixed and heated to 138° C. Chlorine was added at the rate of 15.4 grams per hour over 6.5 hours and then at 11.3 grams per hour for 1.5 hours. The temperature was raised linearly from 138° C.–190° C. during the 8 hours of the chlorine addition.

Following chlorination, the mixture was heated to 220° C. and held for four hours. Nitrogen gas was blown through the mixture at 220° C. for the final two hours. The PIB-succinic anhydride formed in this reaction has a chlorine content of 0.070% weight or 700 parts per million.

The 700 ppm chlorine polyisobutylene substituted succinic anhydride made above was further reacted with a polyamine bottoms product to form a dispersant. The amines, 248.2 grams (5.85 equivalents) was mixed with 4900 grams of a 150 SN oil. The mixture was heated with stirring at 110° C. and 4097 grams (3.9 equivalents) of the 700 ppm chlorine PIB-succinic anhydride was added over 1 hour. The mixture was kept at 110° C. for 0.5 hours with nitrogen blowing through at 0.1 cu ft/hour. The mixture was then heated to 155° C. over 0.75 hours and kept at 155° C. for 5 hours while water was distilled off FAX-5 filter aid (138 grams) was added to the mixture and after 0.25 hours at 155° C., the mixture was filtered through a filter cloth to give the dispersant with a chlorine content of 311 ppm.

It should be recognized that while chlorine up to about 0.9 moles of chlorine/mole of conventional PIB may be used in this invention depending upon the tetra- and trisubstituted end groups, lesser amounts up to this maximum of 0.9 moles may also be used. In reacting the partially chlorinated polyisobutylene with maleic anhydride, mole ratios of 0.5–5 to 1 for anhydride to polyisobutylene may be used. Also, for reacting the low halogen polyisobutylene succinic anhydride with amines, alcohols and metal-containing compounds to form dispersants, esters and metal derivatives of the PIB-succinic anhydrides, a wide range of ratios for the reactants with the low chlorine containing PIB-succinic anhydride acylating agent may be used. The mole ratios of acylating agent to reactant can be from 10:1 to 1:10. It is preferred that the PIB-succinic anhydride be thoroughly succinated.

A further method of carrying out this invention is to use a diluent gas during the chlorination reaction. Useful gases are $CO_2$, $N_2$, and $N_2O$. The use of the gases resulted in PIB-succinic anhydrides having lower chlorine content than when chlorine is used alone. A standard reaction with no dilution gas was run wherein a mixture of one mole of conventional Mn 2000 polyisobutylene treated with 0.31 moles of chlorine was reacted in the presence of 2.2 moles of maleic anhydride. The PIB and anhydride were heated at 138° C. and the temperature ramped to 190° C. over a seven hour period. The chlorine was added over the first three hours (temperature at end 160° C.). The mixture was kept at 200° C. for 24 hours then stripped. This yielded a PIB-succinic anhydride with 293 ppm chlorine.

Figure 2:
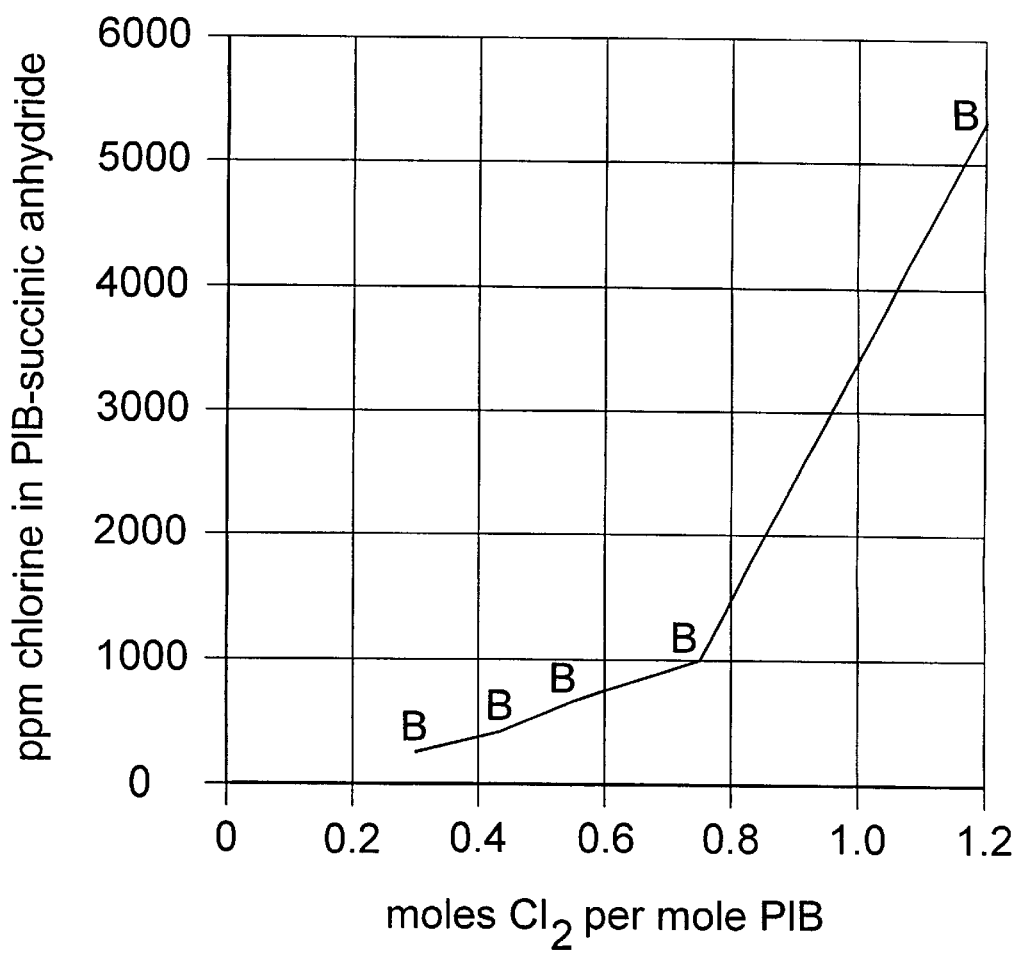
FIG. 2 graphically illustrates the data of Table B.

When a dilution gas was used, the gas was added at the rate of 0.1–0.2 standard cubic foot per hour over the whole time of reaction. Use of the three gases listed above gave ppm chlorine value PIB-succinic anhydrides of $CO_2$-179, $N_2O$-181, $N_2$-218. This demonstrates the utility of using a dilution gas in the reaction process. The chlorination of a PIB $\overline{Mn}$ 2000 solvent free has about the same type of curve as is shown in FIG. 2 except that the chlorine contents of the polyolefin substituted carboxylic acylating agent is higher. For example, when 1.2 moles of chlorine were used per mole of PIB, the PIB succinic anhydride chlorine content from halogenation in hexane is 1022 ppm (Table 3B) while that from halogenation without solvent (Table 2C) is 5350. The higher chlorine level in the solvent-free chlorination reaction is attributable to polymer backbone halogenation which becomes more predominant at the higher temperatures used in solvent-free halogenation.

The main point of the data in Table 3 and the curve in FIG. 2 is that if the maximum amount of halogen used in the halogenation reaction of the polyolefin is limited in amount up to that which is necessary to halogenate the tri and tetrasubstituted end group of the polyolefin, then PIB-succinic anhydrides result from these polyolefins which are low in chlorine and which may be used in compositions having low halogen requirements. Amounts of halogen lower than the maximum are, of course, also useful as is shown in Table 3 and FIG. 2. Use of halogen beyond this amount results in non-labile halogen being incorporated with the polyisobutene. In FIG. 2 and the data in Table 3 indicate that at a value of about 0.9 moles of chlorine per mole of PIB, largely halogenation of the tri and tetrasubstituted end groups takes place. This value corresponds to the tri and tetrasubstituted end group mole percent in the PIB. If one correlates halogen addition to the PIB with the tri and tetrasubstituted end groups then low halogen content PIBs result. This means, of course, that the derivatives made from these PIBs such as PIB-succinic anhydrides and reaction products of PIB-succinic anhydrides such as dispersants and metal salts will also be low in halogen and thus be usable in compositions having low halogen requirements. The useful range of halogen used to halogenate the polyisobutylene then ranges over value up to about 0.9 moles of chlorine per mole of PBU.

A myriad of examples of forming polyisobutylene chlorides, their further reactions to form polyisobutylene succinic anhydrides and onward reactions of the succinic anhydrides are given in U.S. Pat. No. 4,234,435 which has been incorporated herein by reference in its entirety. While the low chlorine carboxylic acylating agents have utility in themselves for inclusion in lubricants and fuels, it is expected that their major use will be as intermediates in processes for preparing carboxylic derivative compositions comprising reacting one or more acylating reagents with a reactant selected from the group consisting of (a) amine characterized by the presence within its structure of at least one H—N<group, (b) alcohol, (c) reactive metal or reactive metal compound, and (d) a combination of two or more of (a) through (c), the components of (d) being reacted with said acylating reagents simultaneously or sequentially in any order.

Identification of compounds included in (a) through (c) and the reaction conditions necessary to prepare the carboxylic derivatives using these compounds is given in the '435 patent and particularly at columns 20–41 and in patents referenced therein which are also incorporated herein by reference.

Also, the derivatives of the carboxylic acylating agents formed by reacting the components (a)–(c) above may be post-treated. Post treatment is described in the '435 patent at column 41–42 and in the reference cited therein which are also incorporated by reference.

Acylated nitrogen compositions prepared by reacting the acylating reagents of this invention with an amine as described above are post-treated by contacting the acylated nitrogen compositions thus formed (e.g., the carboxylic derivative compositions) with one or more post-treating reagents selected from the group consisting of boron oxide, boron oxide hydrate, boron acids, esters of boron acids, carbon disulfide, sulfur, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols, and sulfur plus phenols. The same post-treating reagents are used with carboxylic derivative compositions prepared from the acylating reagents of this invention and a combination of amines and alcohols as described above. However, when the carboxylic derivative compositions of this invention are derived from alcohols and the acylating reagents, that is, when they are acidic or neutral esters, the post-treating reagents are usually selected from the group consisting of boron oxide, boron oxide hydrate, boron acids, esters of boron acids, sulfur, sulfur chlorides, phosphorus sulfides, phosphorus oxides, carboxylic acid acylating agents, epoxides, and episulfides.

Since post-treating processes involving the use of these post-treating reagents is known insofar as application to reaction products of high molecular weight carboxylic acid acylating agents of the prior art and amines and/or alcohols, detailed descriptions of these processes herein is unnecessary. In order to apply the prior art processes to the carboxylic derivative compositions of this invention, all that is necessary is that reaction conditions, ratio of reactants, and the like as described in the prior art, be applied to the novel carboxylic derivative compositions of this invention. The following U.S. patents are expressly incorporated herein by reference for their disclosure of post-treating processes and post-treating reagents applicable to the carboxylic derivative compositions of this invention: U.S. Pat. Nos. 3,087,936; 3,200,107; 3,254,025; 3,256,185; 3,278,550; 3,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012 (use of acidified clays in post-treating carboxylic derivative compositions derived from the acylating reagents of this invention and amines); U.S. Pat. Nos. 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943;

3,185,704; 3,551,466; 3,415,750; 3,312,619; 3,280,034; 3,718,663; 3,652,616; UK Pat. No. 1,085,903; UK Pat. No. 1,162,436; U.S. Pat. No. 3,558,743. The processes of these incorporated patents, as applied to the carboxylic derivative compositions of this invention, and the post-treated carboxylic derivative compositions thus produced constitute a further aspect of this invention.

The compounds formed by the methods of this invention, the halogenated polyolefins; polyolefin substituted carboxylic acylating agents; derivatives of the acylating agents and post-treated products of the derivatives as noted are useful in fuels and lubricants. As such, the compounds are mixed in fuels and lubricants at levels from about 0.05 up to about 30% by weight. The lubricants are oils of lubricating viscosity being mineral oils refined to various degrees, synthetic oils such as esters or polyolefins or natural oils from plants or animal sources with compounds of this invention mixed therein at amounts effective to accomplish their purpose.

The lubricant compositions of this invention include lubricating oils and greases although, for the most part, they will be lubricating oils. The lubricating oil compositions of this invention are based on natural and synthetic lubricating oils and mixtures thereof. These lubricants include crankcase lubricating oils for spark-ignited and compression-ignited internal combustion engines, such as automobile and truck engines, marine and railroad diesel engines, and the like. Automatic transmission fluids, transaxle lubricants, gear lubricants, metal-working lubricants, hydraulic fluids and other lubricating oil and grease compositions can also benefit from the incorporation therein of the acylating reagents and carboxylic derivative compositions of the present invention as can fuel compositions.

What is claimed is:

1. A method for making halogen containing polyolefin reaction products having labile halogen substituents for use in lubricants, the method comprising the steps of:
    A. forming a mixture comprising a conventional polyolefin having a molecular weight of $\overline{Mn}$ 300–10,000 and having a total of tetra- and tri-substituted unsaturated end groups in the amount of up to about 90 mole percent based on the moles of said polyolefin and a halogen, said halogen being bromine or chlorine or mixtures thereof, and wherein said mixture further comprises hexane or other substantially chlorine inert liquid as a solvent, and wherein said mixture is heated at a temperature of less than about 70° C.; and wherein said halogen is present in said mixture on a molar basis up to about an amount equal to the moles of tetra- and tri-substituted end groups;
    B. reacting said mixture under time and temperature parameters selected to effect reaction of said polyolefin end groups and said halogen to produce a polyolefin reaction product having labile halogen substituents, and wherein the polyolefin reaction product halogen content is limited by correlating said amount of halogen reacted to said tetra and tri-substituted end groups, and wherein said reaction is carried out using a dilution gas.

2. The method according to claim 1, wherein
    A. said mixture further comprises an α-β unsaturated acids, anhydrides or mixtures thereof; and wherein
    B. said reacting further produces a polyolefin substituted reaction product comprising a polyolefin substituted acid, anhydride or mixtures thereof having low chlorine content.

3. The method according to claim 1, wherein said method further comprises the steps of:
    A. forming a mixture comprising said halogen containing polyolefin reaction products having labile halogen substituents of claim 1 and an α-β unsaturated compound, said compound comprising α-β unsaturated acids, anhydrides, or mixtures thereof;
    B. reacting said mixture under time and temperature parameters selected to effect reaction of said polyolefin reaction product with said α-β unsaturated compound to produce a polyolefin substituted reaction product having low halogen content, said substituted reaction product comprising a polyolefin substituted acid, anhydride, or mixture thereof having low halogen content.

4. A method according to claim 1, wherein said polyolefin is polybutene having $\overline{Mn}$ of about 500–2500.

5. A method according to claim 1, wherein said dilution gas is $N_2O$ or $CO_2$ or $N_2$.

6. A method according to claims 2 or 3, wherein said polyolefin substituted reaction product is a polybutene substituted succinic acid, anhydride or mixture thereof.

7. A method according to claims 2, 3 or 6, wherein said halogen content of said polyolefin substituted reaction product is 1000 parts per million or less on an oil free basis.

8. The method according to claims 2, 3 or 6, wherein the molar ratio of said polyolefin reaction product to α-β unsaturated compound is 1:0.1 to 1:10.

* * * * *

UNITED STATES PATENT AND TRADEMARK OFFICE
CERTIFICATE OF CORRECTION

PATENT NO. : 6,077,909
DATED : June 20, 2000
INVENTOR(S) : John K. Pudelski, Christopher J. Kolp, Jeffry G. Dietz, Charles K. Baumanis, Stuart L. Bartley and James D. Burrington It is certified that error appears in the above-identified patent and that said Letters Patent is hereby corrected as shown below:

<u>Title page,</u>
Item [75], Inventors: Kurt F. Wollenberg of Chardon, Ohio, is added as an inventor.

Signed and Sealed this

Sixth Day of August, 2002

*Attest:*

*Attesting Officer*

JAMES E. ROGAN
*Director of the United States Patent and Trademark Office*